(12) United States Patent
Wasa et al.

(10) Patent No.: US 12,043,684 B2
(45) Date of Patent: Jul. 23, 2024

(54) OPTICAL LENS

(71) Applicant: MITSUI CHEMICALS, INC., Tokyo (JP)

(72) Inventors: Hideki Wasa, Kawasaki (JP); Sunil Krzysztof Moorthi, Ichihara (JP); Haruka Saito, Chiba (JP); Futoshi Fujimura, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 968 days.

(21) Appl. No.: 17/043,359

(22) PCT Filed: Mar. 15, 2019

(86) PCT No.: PCT/JP2019/010964
§ 371 (c)(1),
(2) Date: Sep. 29, 2020

(87) PCT Pub. No.: WO2019/188447
PCT Pub. Date: Oct. 3, 2019

(65) Prior Publication Data
US 2021/0024675 A1  Jan. 28, 2021

(30) Foreign Application Priority Data
Mar. 30, 2018  (JP) ................ 2018-066628

(51) Int. Cl.
| | | |
|---|---|---|
| C08F 232/08 | (2006.01) | |
| C08F 210/02 | (2006.01) | |
| C08F 212/32 | (2006.01) | |
| G02B 1/04 | (2006.01) | |
| G02B 3/00 | (2006.01) | |

(52) U.S. Cl.
CPC .......... *C08F 232/08* (2013.01); *C08F 210/02* (2013.01); *C08F 212/32* (2013.01); *G02B 1/041* (2013.01); *G02B 3/00* (2013.01); *G02B 2003/0093* (2013.01)

(58) Field of Classification Search
None
See application file for complete search history.

(56) References Cited

U.S. PATENT DOCUMENTS

| | | |
|---|---|---|
| 5,874,512 A | 2/1999 | Farley et al. |
| 6,063,886 A | 5/2000 | Yamaguchi et al. |
| 2009/0018296 A1 | 1/2009 | Ikeda et al. |

FOREIGN PATENT DOCUMENTS

| | | |
|---|---|---|
| JP | H10287713 A | 10/1998 |
| JP | 2000502130 A | 2/2000 |
| JP | 2006143799 A | 6/2006 |
| JP | 2009046613 A | 3/2009 |
| JP | 2010235719 A | 10/2010 |
| JP | 2012-233118 A | 11/2012 |
| JP | 2018145425 A * | 9/2018 |
| JP | 2018145425 A | 9/2018 |
| WO | 2006104049 A1 | 10/2006 |

OTHER PUBLICATIONS

Machine translation of JP 2018145245 A, retrieved Sep. 2023. (Year: 2023).*
International Search Report (with an English translation) and Written Opinion issued on Jun. 11, 2019, in corresponding International Patent Application No. PCT/JP2019/010964. (10 pages).

* cited by examiner

*Primary Examiner* — Nicole M. Buie-Hatcher
(74) *Attorney, Agent, or Firm* — BUCHANAN, INGERSOLL & ROONEY PC

(57) ABSTRACT

The optical lens of the present invention contains a molded product constituted with a cyclic olefin-based copolymer having a constitutional unit (A) derived from an α-olefin having 2 to 20 carbon atoms, a constitutional unit (B) derived from a cyclic olefin, and a constitutional unit (C) derived from an aromatic vinyl compound represented by a specific chemical formula.

10 Claims, No Drawings

OPTICAL LENS

TECHNICAL FIELD

The present invention relates to an optical lens.

BACKGROUND ART

In optical lenses such as an imaging lens, an fθ lens, and a pickup lens, a cyclic olefin-based polymer is used. The cyclic olefin-based polymer used in molded products such as the optical lenses is required to have characteristics such as high transparency, excellent dimensional stability, and excellent heat resistance.

Furthermore, for miniaturization and thinning, the imaging lens used, for example, in smartphones, digital cameras, and the like is required to have a further improved refractive index while maintaining a low birefringence value.

Examples of techniques relating to the cyclic olefin-based polymer used in the optical lenses include those described in Patent Document 1 (Japanese Unexamined Patent Publication No. 10-287713) and Patent Document 2 (Japanese Unexamined Patent Publication No. 2010-235719).

Patent Document 1 describes a cyclic olefin-based copolymer obtained from (A) linear or branched α-olefin having 2 to 20 carbon atoms, (B) cyclic olefin represented by a predetermined chemical formula, and (C) aromatic vinyl compound, in which a limiting viscosity [η] of the copolymer is within a range of 0.1 to 10 dl/g, and a content ratio of a constitutional unit derived from (B) cyclic olefin and a content ratio of a constitutional unit derived from (C) aromatic vinyl compound satisfy a specific relationship.

Patent Document 2 describes a cyclic olefin-based polymer containing a constitutional unit (A), which is derived from ethylene or an α-olefin having 3 to 20 carbon atoms, at 30 to 70 mol %, a constitutional unit (B), which is derived from a cyclic olefin represented by a predetermined chemical formula, at 20 to 50 mol %, and a constitutional unit (C), which is derived from an aromatic vinyl compound, at 0.1 to 20 mol %, in which a limiting viscosity [η], $^1$H-NMR, and a glass transition temperature of the polymer satisfy a predetermined condition.

RELATED DOCUMENTS

Patent Documents

[Patent Document 1] Japanese Unexamined Patent Publication No. 10-287713
[Patent Document 2] Japanese Unexamined Patent Publication No. 2010-235719

SUMMARY OF THE INVENTION

Technical Problem

According to the examination conducted by the inventors of the present invention, it has been revealed that for the uses such as optical lenses, in order to improve image quality and improve a degree of freedom in designing the optical lenses, a resin material of which the Abbe number is adjusted to a value lower than the Abbe number of the conventional resin materials is required.

The present invention has been made in consideration of the circumstances described above, and an object thereof is to provide an optical lens which has a high refractive index and of which the Abbe number can be adjusted to a value lower than the Abbe number of the conventional resin materials.

Solution to Problem

In order to achieve the above object, the inventors of the present invention conducted an intensive examination. As a result, the inventors have found that by using a cyclic olefin-based copolymer having a constitutional unit (A) derived from an α-olefin having 2 to 20 carbon atoms, a constitutional unit (B) derived from a cyclic olefin, and a constitutional unit (C) derived from an aromatic vinyl compound represented by General Formula (C-1), it is possible to adjust the Abbe number of an obtained optical lens to a value lower than the Abbe number of the conventional resin materials while the optical lens has a high refractive index.

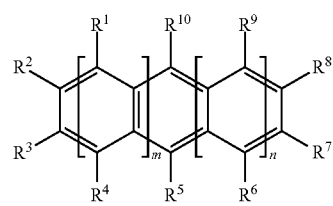

(C-1)

(D-1)

In Formula (C-1), any one of all Rs represented by $R^1$ to $R^{10}$ is a hydrocarbon group having a vinyl group represented by Formula (D-1), and * in Formula (D-1) represents a bond.

In Formulas (C-1) and (D-1), all of m, n, and q represent 0 or a positive integer, q represents a positive integer in a case where both of m and n represent 0, a plurality of $R^1$s and $R^4$s may be the same or different respectively in a case where m is 2 or more, a plurality of $R^6$s and $R^9$s may be the same or different respectively in a case where n is 2 or more, $R^1$ to $R^{10}$ other than the hydrocarbon group having a vinyl group represented by Formula (D-1), $R^{21}$, and $R^{22}$ each independently represent a hydrogen atom, a halogen atom except for a fluorine atom, or a hydrocarbon group having 1 to 20 carbon atoms that may be substituted with a halogen atom except for a fluorine atom, $R^1$ and $R^2$, $R^2$ and $R^3$, $R^3$ and $R^4$, $R^6$ and $R^7$, $R^7$ and $R^8$, and $R^8$ and $R^9$ may form a monocyclic ring by being bonded to each other, and the monocyclic ring may have a double bond.

That is, according to the present invention, the following optical lens is provided.

[1]

An optical lens constituted with a molded product containing a cyclic olefin-based copolymer having a constitutional unit (A) derived from an α-olefin having 2 to 20 carbon atoms, a constitutional unit (B) derived from a cyclic olefin, and a constitutional unit (C) derived from an aromatic vinyl compound represented by General Formula (C-1).

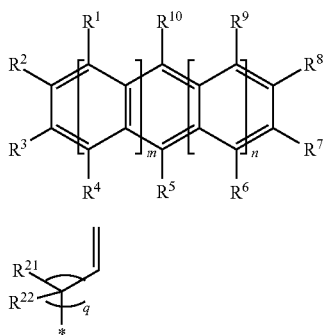 (C-1)

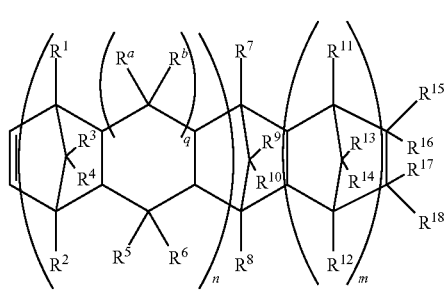 (B-1)

(D-1)

In Formula (C-1), any one of all Rs represented by $R^1$ to $R^{10}$ is a hydrocarbon group having a vinyl group represented by Formula (D-1), and * in Formula (D-1) represents a bond.

In Formulas (C-1) and (D-1), all of m, n, and q represent 0 or a positive integer, q represents a positive integer in a case where both of m and n represent 0,

- a plurality of $R^1$s and $R^4$s may be the same or different respectively in a case where m is 2 or more, and a plurality of $R^6$s and $R^9$s may be the same or different respectively in a case where n is 2 or more,
- $R^1$ to $R^{10}$ other than the hydrocarbon group having a vinyl group represented by Formula (D-1), $R^{21}$, and $R^{22}$ each independently represent a hydrogen atom, a halogen atom except for a fluorine atom, or a hydrocarbon group having 1 to 20 carbon atoms that may be substituted with a halogen atom except for a fluorine atom,
- $R^1$ and $R^2$, $R^2$ and $R^3$, $R^3$ and $R^4$, $R^6$ and $R^7$, $R^7$ and $R^8$, and $R^8$ and $R^9$ may form a monocyclic ring by being bonded to each other, and the monocyclic ring may have a double bond.

[2]
The optical lens described in [1],
which has an Abbe number (ν) 30 or more and 55 or less.

[3]
The optical lens described in [1] or [2],
in which in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is 10 mol % or more and 80 mol % or less.

[4]
The optical lens described in any one of [1] to [3],
in which in a case where a total content of the constitutional unit (B) and the constitutional unit (C) in the cyclic olefin-based copolymer is 100 mol %, a content of the constitutional unit (C) in the cyclic olefin-based copolymer is 1 mol % or more and 95 mol % or less.

[5]
The optical lens described in any one of [1] to [4],
in which the cyclic olefin contains a compound represented by Formula (B-1).

In Formula (B-1), n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, and $R^{15}$ and $R^{16}$ or $R^{17}$ and $R^{18}$ may form an alkylidene group.

[6]
The optical lens described in [5], in which m in Formula (B-1) represents a positive integer.

[7]
The optical lens described in any one of [1] to [6], in which in General Formulas (C-1) and (D-1), all of m, n, and q represent 0, 1, or 2, and in a case where both of m and n represent 0, q represents 1 or 2.

[8]
The optical lens described in any one of [1] to [7],
in which a glass transition temperature (Tg) of the cyclic olefin-based copolymer measured using a differential scanning calorimeter (DSC) is 100° C. or higher and 180° C. or lower.

[9]
The optical lens described in any one of [1] to [8],
in which a limiting viscosity [ii] of the cyclic olefin-based copolymer measured in decalin at 135° C. is 0.05 dl/g or higher and 5.00 dl/g or lower.

[10]
The optical lens described in any one of [1] to [9],
which has a birefringence 1 nm or higher and 200 nm or lower.

[11]
The optical lens described in any one of [1] to [10],
in which the aromatic vinyl compound contains at least one kind of compound selected from allylbenzene, 1-vinylnaphthalene, 2-vinylnaphthalene, and 9-vinylanthracene.

[12]
The optical lens described in any one of [1] to [11],
in which q in Formula (D-1) represents 0.

Advantageous Effects of Invention

According to the present invention, it is possible to provide an optical lens constituted with a molded product containing a cyclic olefin-based copolymer which has a high refractive index and of which the Abbe number can be adjusted to a value lower than the Abbe number of the conventional resin materials.

DESCRIPTION OF EMBODIMENTS

Hereinafter, the present invention will be described based on embodiments. In the present embodiments, unless otherwise specified, "A to B" that indicates a range of numerical values represents "A or more and B or less".

[Cyclic Olefin-Based Copolymer]

First, a cyclic olefin-based copolymer (P) according to the present embodiment will be described.

The cyclic olefin-based copolymer (P) according to the present embodiment has a constitutional unit (A) derived from an α-olefin having 2 to 20 carbon atoms, a constitutional unit (B) derived from a cyclic olefin, and a constitutional unit (C) derived from an aromatic vinyl compound represented by Formula (C-1).

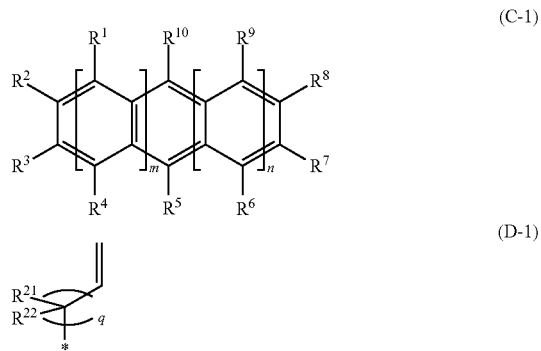

In Formula (C-1), any one of all Rs represented by $R^1$ to $R^{16}$ is a hydrocarbon group having a vinyl group represented by Formula (D-1), and * in Formula (D-1) represents a bond.

In Formulas (C-1) and (D-1), all of m, n, and q represent 0 or a positive integer, q represents a positive integer in a case where both of m and n represent 0, a plurality of $R^1$s and $R^4$s may be the same or different respectively in a case where m is 2 or more, and a plurality of $R^6$s and $R^9$s may be the same or different respectively in a case where n is 2 or more, $R^1$ to $R^{10}$ other than the hydrocarbon group having a vinyl group represented by Formula (D-1), $R^{21}$, and $R^{22}$ each independently represent a hydrogen atom, a halogen atom except for a fluorine atom, or a hydrocarbon group having 1 to 20 carbon atoms that may be substituted with a halogen atom except for a fluorine atom, $R^1$ and $R^2$, $R^2$ and $R^3$, $R^3$ and $R^4$, $R^6$ and $R^7$, $R^7$ and $R^8$, and $R^8$ and $R^9$ may form a monocyclic ring by being bonded to each other, and the monocyclic ring may have a double bond.)

The cyclic olefin-based copolymer (P) according to the present embodiment has the constitutional unit (A) derived from an α-olefin having 2 to 20 carbon atoms, the constitutional unit (B) derived from a cyclic olefin, and the constitutional unit (C) derived from an aromatic vinyl compound represented by (C-1). Therefore, the copolymer (P) satisfies a high refractive index required to optical lenses and the like, and the Abbe number of the copolymer can be adjusted to a low value.

Therefore, in a case where the cyclic olefin-based copolymer (P) according to the present embodiment is used, it is possible to obtain a molded product which has a high refractive index and an Abbe number lower than the Abbe number of the conventional resin materials.

(Constitutional Unit (A) Derived from α-Olefin)

The constitutional unit (A) according to the present embodiment is a constitutional unit derived from an α-olefin having 2 to 20 carbon atoms.

The α-olefin having 2 to 20 carbon atoms may be linear or branched, and examples thereof include a linear α-olefin having 2 to 20 carbon atoms such as ethylene, propylene, 1-butene, 1-pentene, 1-hexene, 1-octene, 1-decene, 1-dodecene, 1-tetradecene, 1-hexadecene, 1-octadecene, or 1-eicosene; a branched α-olefin having 4 to 20 carbon atoms such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, or 3-ethyl-1-hexene; and the like. Among these, a linear α-olefin having 2 to 4 carbon atoms is preferable, and ethylene is particularly preferable. One kind of each of these linear or branched α-olefins can be used singly, or two or more kinds of these linear or branched α-olefins can be used in combination.

In a case where the total content of the constitutional unit (A), the constitutional unit (B), and the constitutional unit (C) in the cyclic olefin-based copolymer (P) according to the present embodiment is 100 mol %, the content of the constitutional unit (A) in the cyclic olefin-based copolymer (P) according to the present embodiment is preferably 10 mol % or more and 80 mol % or less, more preferably 30 mol % or more and 75 mol % or less, even more preferably 40 mol % or more and 70 mol % or less, and particularly preferably 50 mol % or more and 70 mol % or less.

In a case where the content of the constitutional unit (A) is the lower limit described above or more, the heat resistance or the dimensional stability of the obtained molded product can be improved. Furthermore, in a case where the content of the constitutional unit (A) is the upper limit described above or less, the transparency of the obtained molded product and the like can be improved.

In the present embodiment, the content of the constitutional unit (A) can be measured, for example, by $^1$H-NMR or $^{13}$C-NMR.

(Constitutional Unit (B) Derived from Cyclic Olefin)

The constitutional unit (B) according to the present embodiment is a constitutional unit derived from a cyclic olefin. From the viewpoint of further improving the refractive index of the obtained molded product, it is preferable that the constitutional unit (B) according to the present embodiment contains a constitutional unit derived from a compound represented by the following Formula (B-1).

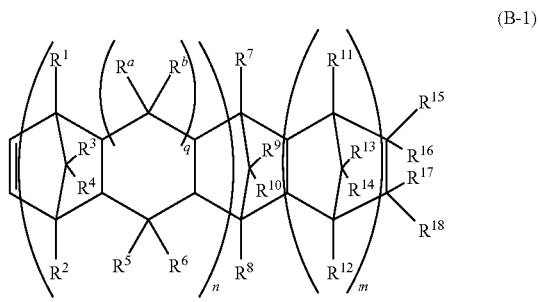

(In Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, and $R^{15}$ and $R^{16}$ or $R^{17}$ and $R^{18}$ may form an alkylidene group.)

R[1] to R[18] and R[a] and R[b] preferably each represent a hydrocarbon group having 1 to 20 carbon atoms.

From the viewpoint of adjusting the glass transition temperature (Tg) of the obtained cyclic olefin-based copolymer to an optimal value, m in Formula (B-1) is preferably a positive integer.

Among these, the constitutional unit (B) according to the present embodiment preferably contains at least one kind of constitutional unit selected from a constitutional unit derived from bicyclo[2.2.1]-2-heptene, a constitutional unit derived from tetracyclo[4.4.0.1$^{2,5}$.1$^{7,10}$]-3-dodecene, a constitutional unit derived from hexacyclo[6,6,1,1$^{3,6}$,1$^{10,13}$,0$^{2,7}$, 0$^{9,14}$]heptadecene-4, and the like, more preferably contains at least one kind of constitutional unit selected from a constitutional unit derived from bicyclo[2.2.1]-2-heptene and a constitutional unit derived from tetracyclo[4.4.0.1$^{2,5}$.1$^{7,10}$]-3-dodecene, and particularly preferably contains a constitutional unit derived from tetracyclo[4.4.0.1$^{2,5}$.1$^{7,10}$]-3-dodecene.

(Constitutional Unit (C) Derived from Aromatic Vinyl Compound)

The constitutional unit (C) according to the present embodiment is a constitutional unit derived from an aromatic vinyl compound represented by General Formula (C-1).

One kind of the compound according to the present embodiment may be used singly, or two or more kinds of the compounds according to the present embodiment may be used in combination.

In Formula (C-1), any one of all Rs represented by R$^1$ to R$^{10}$ is a hydrocarbon group having a vinyl group represented by Formula (D-1), and * in Formula (D-1) represents a bond.

In Formulas (C-1) and (D-1), all of m, n, and q represent 0 or a positive integer, q represents a positive integer in a case where both of m and n represent 0,
- a plurality of R$^1$s and R$^4$s may be the same or different respectively in a case where m is 2 or more, a plurality of R$^6$s and R$^9$s may be the same or different respectively in a case where n is 2 or more,
- R$^1$ to R$^{10}$ other than the hydrocarbon group having a vinyl group represented by Formula (D-1), R$^{21}$, and R$^{22}$ each independently represent a hydrogen atom, a halogen atom except for a fluorine atom, or a hydrocarbon group having 1 to 20 carbon atoms that may be substituted with a halogen atom except for a fluorine atom,
- R$^1$ and R$^2$, R$^2$ and R$^3$, R$^3$ and R$^4$, R$^6$ and R$^7$, R$^7$ and R$^8$, and R$^8$ and R$^9$ may form a monocyclic ring by being bonded to each other, and the monocyclic ring may have a double bond.

Preferably, in Formulas (C-1) and (D-1), all of m, n, and q represent 0, 1 or 2, and q represents 1 or 2 in a case where both of m and n represent 0. More preferably, both of m and n represent 0 and q represents 1; or m represents 0, n represents 1 or 2, and q represents 0 or 1. m preferably represents 0 or 1. n preferably represents 1 or 2. q preferably represents 0.

Among Rs represented by R$^1$ to R$^{10}$ in Formula (C-1), R$^1$ to R$^{10}$ other than the hydrocarbon group having a vinyl group represented by Formula (D-1) and R$^{21}$ and R$^{22}$ in Formula (D-1) preferably represent a hydrogen atom or a hydrocarbon group having 1 to 20 carbon atoms, and more preferably represent a hydrogen atom.

Examples of the hydrocarbon group having 1 to 20 carbon atoms include an alkyl group having 1 to 20 carbon atoms, a cycloalkyl group having 3 to 15 carbon atoms, an aromatic hydrocarbon group, and the like. More specifically, examples of the alkyl group include a methyl group, an ethyl group, a propyl group, an isopropyl group, an amyl group, a hexyl group, an octyl group, a decyl group, a dodecyl group, an octadecyl group, and the like. Examples of the cycloalkyl group include a cyclohexyl group, and the like. Examples of the aromatic hydrocarbon group include an aryl group and an aralkyl group such as a phenyl group, a tolyl group, a naphthyl group, a benzyl group, and a phenyl ethyl group. These hydrocarbon groups may be substituted with a halogen atom except for a fluorine atom.

Among these, as the structure represented by (C-1) according to the present embodiment, for example, at least one kind of compound selected from allylbenzene, 1-vinylnaphthalene, 2-vinylnaphthalene, and 9-vinylanthracene is preferable, and at least one kind of compound selected from 1-vinylnaphthalene, 2-vinylnaphthalene, and 9-vinylanthracene is particularly preferable. It is considered that in a case where these particularly preferable aromatic vinyl compounds are used, the compounds may be excellently copolymerized with the α-olefin from which the constitutional unit (A) is derived and the cyclic olefin from which the constitutional unit (B) is derived, more aromatic rings can be efficiently introduced into the obtained cyclic olefin-based copolymer, and accordingly, particularly the refractive index could be adjusted to a high value and the Abbe number could be adjusted to a low value.

The aromatic vinyl compound represented by General Formula (C-1) according to the present embodiment does not include styrene. In a case where styrene is used as the aromatic vinyl compound, it is difficult to adjust the Abbe number to an optimal range which is, for example, 30 or more and 50 or less.

In a case where the total content of the constitutional unit (B) and the constitutional unit (C) in the cyclic olefin-based copolymer (P) according to the present embodiment is 100 mol %, the content of the constitutional unit (C) in the cyclic olefin-based copolymer (P) according to the present embodiment is preferably 1 mol % or more and 95 mol % or less, more preferably 2 mol % or more and 60 mol % or less, and even more preferably 3 mol % or more and 40 mol % or less.

In a case where the content of the constitutional unit (C) is the lower limit described above or more, in the obtained molded product, the refractive index can be kept high while the Abbe number can be further reduced. Furthermore, in a case where the content of the constitutional unit (C) is the upper limit described above or less, the balance between the refractive index and the Abbe number in the obtained molded product can be further improved.

In the present embodiment, the content of the constitutional unit (B) and the constitutional unit (C) can be measured, for example, by $^1$H-NMR or $^{13}$C-NMR.

The copolymerization type of the cyclic olefin-based copolymer (P) according to the present embodiment is not particularly limited, and examples thereof include a random copolymer, a block copolymer, and the like. In the present embodiment, from the viewpoint of making it possible to obtain a molded product excellent in optical properties such as transparency, Abbe number, refractive index, and birefringence, as the cyclic olefin-based copolymer (P) according to the present embodiment, a random copolymer is preferable.

The cyclic olefin-based copolymer (P) according to the present embodiment can be manufactured, for example, by appropriately selecting conditions according to the methods described in Japanese Unexamined Patent Publication No. 60-168708, Japanese Unexamined Patent Publication No. 61-120816, Japanese Unexamined Patent Publication No. 61-115912, Japanese Unexamined Patent Publication No.

61-115916, Japanese Unexamined Patent Publication No. 61-271308, Japanese Unexamined Patent Publication No. 61-272216, Japanese Unexamined Patent Publication No. 62-252406, Japanese Unexamined Patent Publication No. 62-252407, Japanese Unexamined Patent Publication No. 2007-314806, Japanese Unexamined Patent Publication No. 2010-241932, and the like.

In a case where an injection molding sheet having a thickness of 1.0 mm is prepared using the cyclic olefin-based copolymer (P) according to the present embodiment, a refractive index (nd) of the injection molding sheet measured based on ASTM D542 at a wavelength of 589 nm is preferably 1.545 or higher, preferably 1.550 or higher, and more preferably 1.555 or higher. The upper limit of the refractive index (nd) is not particularly limited, but is 1.580 or lower for example.

In a case where the refractive index is within the above range, it is possible to further reduce the thickness of the molded product, which is obtained using the cyclic olefin-based copolymer (P) according to the present embodiment, while maintaining excellent optical characteristics of the molded product.

The refractive index (nd) of the optical lens according to the present embodiment, which is measured at a wavelength of 589 nm on the basis of ASTM D542, is preferably 1.545 or higher, preferably 1.550 or higher, and more preferably 1.555 or higher. The upper limit of the refractive index (nd) is not particularly limited, for example is 1.580 or lower.

From the viewpoint of further improving the transparency of the molded product obtained using the cyclic olefin-based copolymer (P) according to the present embodiment, in a case where an injection molding sheet which is formed of the cyclic olefin-based copolymer (P) and has a thickness of 1.0 mm is prepared, a haze of the injection molding sheet measured based on JIS K7136 is preferably less than 5%.

The haze of the optical lens according to the present embodiment, which is measured at a thickness of 1.0 mm on the basis of JIS K7136, is preferably less than 5%.

From the viewpoint of adjusting an Abbe number (v) of a molded product, which is obtained using the cyclic olefin-based copolymer (P) according to the present embodiment, to a more suitable range, in a case where an injection molding sheet which is formed of the cyclic olefin-based copolymer (P) and has a thickness of 1.0 mm is prepared, the Abbe number (v) of the injection molding sheet is preferably 30 or more and 55 or less, more preferably 35 or more and 50 or less, and even more preferably 40 or more and 47 or less.

The Abbe number (v) of the injection molding sheet can be calculated from refractive indices of the injection molding sheet measured at 23° C. at wavelengths of 486 nm, 589 nm, and 656 nm by using the following equation.

$$v=(nD-1)/(nF-nC)$$

nD: refractive index at wavelength of 589 nm
nC: refractive index at wavelength of 656 nm
nF: refractive index at wavelength of 486 nm The Abbe number (v) of the optical lens according to the present embodiment is preferably 30 or more and 55 or less, more preferably 35 or more and 50 or less, and even more preferably 40 or more and 47 or less.

From the viewpoint of adjusting the birefringence of a molded product, which is obtained from the cyclic olefin-based copolymer (P) according to the present embodiment, to a more suitable range, in a case where an injection molding sheet which is formed of the cyclic olefin-based copolymer (P) and has a thickness of 1.0 mm is prepared, the birefringence of the injection molding sheet is preferably 1 nm or higher and 200 nm or lower, more preferably less than 40 nm, and even more preferably less than 30 nm.

In the present embodiment, the birefringence of the injection molding sheet is an average of phase differences of 20 to 35 mm from a gate direction that are measured at a measurement wavelength of 650 nm by using KOBRA CCD manufactured by Oji Scientific Instruments.

The birefringence of the optical lens according to the present embodiment is preferably 1 nm or higher and 200 nm or lower, more preferably less than 40 nm, and even more preferably less than 30 nm.

From the viewpoint of further improving the heat resistance of the obtained molded product while excellently maintaining the transparency, the Abbe number, the birefringence, and the refractive index of the molded product, a glass transition temperature (Tg) of the cyclic olefin-based copolymer (P) according to the present embodiment that is measured using a differential scanning calorimeter (DSC) is preferably 100° C. or higher and 180° C. or lower, more preferably 120° C. or higher and 170° C. or lower, and even more preferably 130° C. or higher and 160° C. or lower.

A limiting viscosity [η] (in decalin at 135° C.) of the cyclic olefin-based copolymer (P) according to the present embodiment is 0.05 to 5.00 dl/g for example. The limiting viscosity [ii] is preferably 0.20 to 4.00 dl/g, more preferably 0.30 to 2.00 dl/g, and particularly preferably 0.40 to 1.00 dl/g.

[Molded Product]

The molded product according to the present embodiment is a molded product containing the cyclic olefin-based copolymer (P) according to the present embodiment.

The molded product according to the present embodiment contains the cyclic olefin-based copolymer (P) according to the present embodiment. Therefore, in the molded product, heat resistance, transparency, birefringence, chemical resistance, low hygroscopicity, and the like are excellently balanced. Furthermore, the molded product has a higher refractive index and an Abbe number lower than the Abbe number of the conventional resin materials. Accordingly, the molded product is suited for being used as an optical lens.

The molded product according to the present embodiment has excellent optical characteristics. Therefore, the molded product can be suitably used as an optical lens such as a spectacle lens, an fθ lens, a pickup lens, an imaging lens, a sensor lens, a prism, a light guide plate, or an in-vehicle camera lens. Because the molded product has a high refractive index and an Abbe number lower than the Abbe number of the conventional resin materials, the molded product can be particularly suitably used as an imaging lens.

In a case where the total amount of the molded product is 100% by mass, from the viewpoint of further improving the balance among the performances of transparency, birefringence, Abbe number, and refractive index, the content of the cyclic olefin-based copolymer (P) in the molded product according to the present embodiment is preferably 50% by mass or more and 100% by mass or less, more preferably 70% by mass or more and 100% by mass or less, even more preferably 80% by mass or more and 100% by mass or less, and particularly preferably 90% by mass or more and 100% by mass or less.

The molded product according to the present embodiment can be obtained by molding a resin composition containing the cyclic olefin-based copolymer (P) in a predetermined shape. As the method for obtaining the molded product by molding the resin composition containing the cyclic olefin-based copolymer (P), known methods can be used without particular limitation. Although the method varies with the use and the shape of the molded product, for example, it is possible to use extrusion molding, injection molding, compression molding, inflation molding, blow molding, extrusion blow molding, injection blow molding, press molding, vacuum molding, powder slush molding, calendar molding, expansion molding, and the like. Among these, from the viewpoint of molding properties and productivity, an injection molding method is preferable. The molding conditions are appropriately selected according to the purpose of use and the molding method. For example, for injection molding, generally, the temperature of a resin is appropriately selected within a range of 150° C. to 400° C., preferably within a range of 200° C. to 350° C., and more preferably within a range of 230° C. to 330° C.

The molded product according to the present embodiment can be used in various forms such as the shapes of a lens, a sphere, a rod, a plate, a cylinder, a barrel, a tube, fiber, a film, and a sheet.

If necessary, as long as the excellent physical properties of the molded product according to the present embodiment are not impaired, as optional components, known additives can be contained in the molded product according to the present embodiment. As the additives, for example, a phenol-based stabilizer, a higher fatty acid metal salt, an anti-oxidant, an ultraviolet absorber, a hindered amine-based light stabilizer, a hydrochloric acid absorber, a metal deactivator, an antistatic agent, an antifogging agent, a lubricant, a slip agent, a nucleating agent, a plasticizer, a flame retardant, a phosphorus-based stabilizer, and the like can be contained in molded product to such a degree that does not impair the objects of the present invention. The proportion of the additives to be mixed may be appropriately set.

The optical lens according to the present embodiment is constituted with the molded product according to the present embodiment. The optical lens according to the present embodiment may be made into an optical lens system by being combined with an optical lens different from the optical lens described above.

That is, the optical lens system according to the present embodiment includes a first optical lens, which is constituted with the molded product containing the cyclic olefin-based copolymer (P) according to the present embodiment, and a second optical lens different from the first optical lens.

The second optical lens is not particularly limited. For example, as the second optical lens, it is possible to use an optical lens constituted with at least one kind of resin selected from a polycarbonate resin and a polyester resin.

Hitherto, the embodiments of the present invention have been described. However, the embodiments are merely examples of the present invention, and various constitutions other than the embodiments can also be adopted.

Furthermore, the present inventions are not limited to the embodiments, and as long as the objects of the present inventions can be achieved, modification, amelioration, and the like are also included in the inventions.

Hereinafter, the present invention will be further described on the basis of examples, but the present invention is not limited thereto.

<Manufacturing of Cyclic Olefin-Based Copolymer>

Manufacturing Example 1

According to the method described in paragraphs "0107" and "0108" of Japanese Unexamined Patent Publication No. 2010-235719, steps of polymerization, deliming, precipitation, and filtration were performed. Tetracyclo[4.4.0.1$^{2,5}$.1$^{7,10}$]-3-dodecene was used as a cyclic olefin instead of norbornene, and isopropylidenebisindenyl zirconium dichloride was used instead of ($\eta^5$-C$_5$Me$_4$SiMe$_3$)Sc(CH$_2$C$_6$H$_4$NMe$_2$-o)$_2$. 1-vinylnaphthalene was used instead of styrene.

A white powder-like ethylene·tetracyclododecene·1-vinylnaphthalene copolymer was obtained.

In this way, a cyclic olefin-based copolymer (P-1) was obtained.

Manufacturing Examples 2 to 6, 8, and 10 to 12

The cyclic olefin-based copolymers (P-2) to (P-6), (P-8), and (P-10) to (P-12) described in Table 1 were obtained by performing the same operation as that in Manufacturing Example 1, except that a value of the content of each of the constitutional units constituting the cyclic olefin-based copolymer was adjusted to the value described in Table 1, and the cyclic olefin and the aromatic cyclic vinyl compound described in Table 1 were used as a cyclic olefin and an aromatic cyclic vinyl compound.

In Table 1, 1-VN means 1-vinylnaphthalene represented by Formula (2), and 2-VN means 2-vinylnaphthalene represented by Formula (3). 9-VA means 9-vinylanthracene represented by Formula (4), and AB means allylbenzene represented by Formula (5). TD means tetracyclo[4.4.0.1$^{2,5}$.1$^{7,10}$]-3-dodecene, and CPDTD means hexacyclo[6,6,1,1$^{3,6}$,1$^{10,13}$,0$^{2,7}$,0$^{9,14}$]heptadecene-4.

(2)

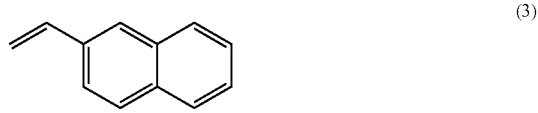

(3)

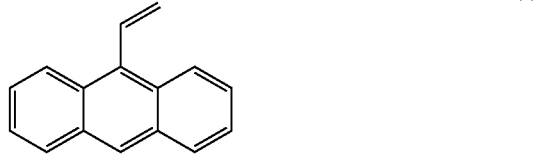

(4)

(5)

NB means bicyclo[2.2.1]hept-2-ene (common name: norbornene) represented by the following formula.

TABLE 1

|  | Example 1 | Example 2 | Example 3 | Example 4 | Example 5 | Example 6 |
|---|---|---|---|---|---|---|
| Cyclic olefin-based copolymer | P-1 | P-2 | P-3 | P-4 | P-5 | P-6 |
| Cyclic olefin from which constitutional unit (B) is derived | TD | TD | TD | TD | TD | CPDTD |
| Aromatic cyclic vinyl compound from which constitutional unit (C) is derived | 1-VN | 1-VN | 2-VN | 2-VN | 9-VA | 9-VA |
| Composition Constitutional unit (A) (derived from ethylene) (mol %) | 61 | 58 | 60 | 58 | 60 | 70 |
| Constitutional unit (B) (derived from norbornene, tetracyclododecene, or hexacycloheptadecene) (mol %) | 35 | 34 | 34 | 32 | 37 | 27 |
| Constitutional unit (C) (mol %) | 4 | 8 | 6 | 10 | 3 | 3 |
| Tg (° C.) | 143 | 144 | 142 | 140 | 149 | 153 |
| [η] (dl/g) | 0.45 | 0.45 | 0.45 | 0.45 | 0.45 | 0.45 |
| Refractive index (nd) | 1.555 | 1.565 | 1.562 | 1.572 | 1.566 | 1.566 |
| Abbe number | 49 | 44 | 46 | 41 | 42 | 42 |

|  | Example 7 | Comparative Example 1 | Example 8 | Example 9 |
|---|---|---|---|---|
| Cyclic olefin-based copolymer | P-8 | P-10 | P-11 | P-12 |
| Cyclic olefin from which constitutional unit (B) is derived | CPDTD | TD | NB | NB |
| Aromatic cyclic vinyl compound from which constitutional unit (C) is derived | AB | — | 1-VN | 9-VA |
| Composition Constitutional unit (A) (derived from ethylene) (mol %) | 65 | 65 | 50 | 50 |
| Constitutional unit (B) (derived from norbornene, tetracyclododecene, or hexacycloheptadecene) (mol %) | 25 | 35 | 46 | 44 |
| Constitutional unit (C) (mol %) | 10 | 0 | 4 | 6 |
| Tg (° C.) | 132 | 150 | 117 | 106 |
| [η] (dl/g) | 0.45 | 0.45 | 0.45 | 0.45 |
| Refractive index (nd) | 1.555 | 1.543 | 1.543 | 1.556 |
| Abbe number | 51 | 56 | 50 | 41 |

Examples 1 to 9 and Comparative Example 1

In each of the examples and the comparative example, various physical properties were measured or evaluated by the following method. The obtained results are shown in Table 1.

[Method for Measuring Content of Each of Constitutional Units Constituting Cyclic Olefin-Based Copolymer]

The content of ethylene, tetracyclo[4.4.0.1$^{2-5}$.1$^{7,10}$]-3-dodecene, hexacyclo[6,6,1,1$^{3,6}$,1$^{10,13}$,0$^{2,7}$,0$^{9,14}$]heptadecene-4, bicyclo[2.2.1]hept-2-ene, and the aromatic vinyl compound was measured under the following conditions by using a nuclear magnetic resonance spectrometer "ECA 500" manufactured by JEOL Ltd.

Solvent: deuterated tetrachloroethane
Sample concentration: 50 to 100 g/l-solvent
Pulse repetition time: 5.5 seconds
Number of times of integration: 6,000 to 16,000
Measurement temperature: 120° C.

From a $^{13}$C-NMR spectrum measured under the above conditions, the composition of ethylene, tetracyclo[4.4.0.1$^{2-5}$.1$^{7,10}$]-3-dodecene, 3-dodecene, hexacyclo[6,6,1,1$^{3,6}$,1$^{10,13}$,0$^{2,7}$,0$^{9,14}$]heptadecene-4, bicyclo[2.2.1]hept-2-ene, and the aromatic vinyl compound were quantified respectively.

[Glass Transition Temperature Tg (° C.)]

By using DSC-6220 manufactured by Shimadzu Corporation, a glass transition temperature Tg of the cyclic olefin-based copolymer was measured in a nitrogen (N2) atmosphere. The cyclic olefin-based copolymer was heated to 200° C. from room temperature at a heating rate of 10° C./min and then kept as it was for 5 minutes. Thereafter, the copolymer was cooled to −20° C. at a cooling rate of 10° C./min and then kept as it was for 5 minutes. From a heat absorption curve formed at the time of heating the copolymer to 200° C. at a heating rate of 10° C./min, the glass transition temperature (Tg) of the cyclic olefin-based copolymer was determined.

[Limiting Viscosity [η]]

By using a mobile viscometer (manufactured by RIGO-SHA & Co., Ltd., type: VNR053U), 0.25 to 0.30 g of the cyclic olefin-based copolymer was dissolved in 25 ml of decalin, thereby obtaining a sample. On the basis of ASTM J1601, the specific viscosity of the cyclic olefin-based copolymer was measured at 135° C., a ratio between the specific viscosity and the concentration was extrapolated to a concentration 0, thereby determining a limiting viscosity [η] of the cyclic olefin-based copolymer.

[Molding of Micro-Compounder]

By using a compact kneader manufactured by Xplore Instruments BV, the cyclic olefin-based copolymers synthesized in Manufacturing Examples 1 to 6, 8, and 10 to 12 were kneaded for 5 minutes at a kneading temperature of 280° C. and 50 rpm. Then, by using an injection molding machine manufactured by Xplore Instruments BV, the copolymers were subjected to injection molding under the conditions of a cylinder temperature of 280° C., an injection pressure of 12 to 15 bar, and a mold temperature of 135° C., thereby preparing respectively injection molding sheets having a thickness of 1.0 mm.

[Birefringence]

For each of the 30 mm×30 mm×1.0 mm (thickness) injection molding sheets molded using the micro-compounder, by using KOBRA CCD manufactured by Oji Scientific Instruments, an average of phase differences of 20 to 35 mm from a gate direction at a measurement wavelength of 650 nm was determined.

Then, the birefringence was evaluated on the basis of the following standards.

A: the average of phase differences was less than 30 nm.
B: the average of phase differences was 30 or more nm and less than 40 nm.
C: the average of phase differences was 40 nm or more.

[Refractive Index]

By using a refractometer (KPR200 manufactured by Shimadzu Corporation), for each of the 30 mm×30 mm×1.0 mm (thickness) injection molding sheets molded using the micro-compounder, a refractive index (nd) at a wavelength of 589 nm was measured on the basis of ASTM D542.

[Abbe Number (v)]

For each of the 30 mm×30 mm×1.0 mm (thickness) injection molding sheets molded using the micro-compounder, the refractive index was measured using the Abbe refractometer at wavelengths of 486 nm, 589 nm, and 656 nm at 23° C. Furthermore, by using the following equation, an Abbe number (v) was calculated.

$$v = (nD-1)/(nF-nC)$$

nD: refractive index at wavelength of 589 nm
nC: refractive index at wavelength of 656 nm
nF: refractive index at wavelength of 486 nm As shown in the above tables, the optical lenses obtained in the examples had a high refractive index and an Abbe number which was lower than the Abbe number of the optical lens obtained in the comparative example. That is, the optical lenses obtained in the examples satisfied various characteristics required to optical lenses and had a high refractive index and a low Abbe number. In Examples 1 to 7 using TD and CPDTD represented by Formula (B-1), in which m represents a positive integer, as a cyclic olefin from which the constitutional unit (B) is derived, Tg was higher than Tg in Examples 8 and 9 using NB represented by Formula (B-1), in which m represents 0, as a cyclic olefin from which the constitutional unit (B) is derived. In contrast, the optical lens of the comparative example, in which the cyclic olefin-based copolymer that did not contain the constitutional unit (C) derived from the aromatic vinyl compound was used, had a high Abbe number. In the comparative example, the intended optical lens was not obtained.

The present application claims priority based on Japanese Patent Application No. 2018-066628 filed on Mar. 30, 2018, the entire disclosure of which is incorporated into the present specification.

The present invention also includes the following aspects.

1. A cyclic olefin-based copolymer having a constitutional unit (A) derived from an α-olefin having 2 to 20 carbon atoms,
a constitutional unit (B) derived from a cyclic olefin, and
a constitutional unit (C) derived from an aromatic vinyl compound represented by General Formula (C-1).

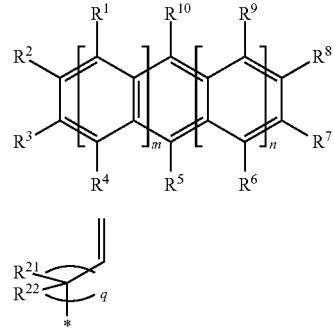

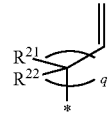

(In Formula (C-1), any one of all Rs represented by $R^1$ to $R^{10}$ is a hydrocarbon group having a vinyl group represented by Formula (D-1), and * in Formula (D-1) represents a bond.

In Formulas (C-1) and (D-1), all of m, n, and q represent 0 or a positive integer, q represents a positive integer in a case where both of m and n represent 0,
a plurality of $R^1$s and $R^4$s may be the same or different respectively in a case where m is 2 or more, a plurality of $R^6$s and $R^9$s may be the same or different respectively in a case where n is 2 or more,
$R^1$ to $R^{10}$ other than the hydrocarbon group having a vinyl group represented by Formula (D-1), $R^{21}$, and $R^{22}$ each independently represent a hydrogen atom, a halogen atom except for a fluorine atom, or a hydrocarbon group having 1 to 20 carbon atoms that may be substituted with a halogen atom except for a fluorine atom,
$R^1$ and $R^2$, $R^2$ and $R^3$, $R^3$ and $R^4$, $R^6$ and $R^7$, $R^7$ and $R^8$, and $R^8$ and $R^9$ may form a monocyclic ring by being bonded to each other, and the monocyclic ring may have a double bond.)

2. The cyclic olefin-based copolymer described in 1.,
in which in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is 10 mol % or more and 80 mol % or less.

3. The cyclic olefin-based copolymer described in 1. or 2.,
in which in a case where a total content of the constitutional unit (B) and the constitutional unit (C) in the cyclic olefin-based copolymer is 100 mol %, a content of the constitutional unit (C) in the cyclic olefin-based copolymer is 1 mol % or more and 95 mol % or less.

4. The cyclic olefin-based copolymer described in any one of 1. to 3.,
in which the cyclic olefin contains a compound represented by Formula (B-1).

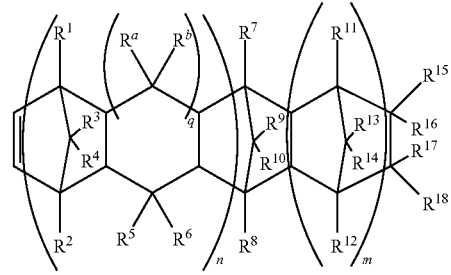

(In Formula [B-1], n is 0 or 1, m is 0 or a positive integer, q is 0 or 1, $R^1$ to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, and $R^{15}$ and $R^{16}$ or $R^{17}$ and $R^{18}$ may form an alkylidene group.)

5. The cyclic olefin-based copolymer described in any one of 1. to 4., in which in General Formulas (C-1) and (D-1), all of m, n, and q represent 0, 1, or 2, and q represents 1 or 2 in a case where both of m and n represent 0.

6. The cyclic olefin-based copolymer described in any one of 1. to 5.,
in which in a case where an injection molding sheet which is formed of the cyclic olefin-based copolymer and has a thickness of 1.0 mm is prepared, an Abbe number (v) of the injection molding sheet is 30 or more and 55 or less.

7. The cyclic olefin-based copolymer described in any one of 1. to 6.,
in which a glass transition temperature (Tg) of the cyclic olefin-based copolymer measured using a differential scanning calorimeter (DSC) is 100° C. or higher and 180° C. or lower.

8. The cyclic olefin-based copolymer described in any one of 1. to 7.,
which has a limiting viscosity [η], measured in decalin at 135° C., of 0.05 dl/g or higher and 5.00 dl/g or lower.

9. The cyclic olefin-based copolymer described in any one of 1. to 8.,
in which in a case where an injection molding sheet which is formed of the cyclic olefin-based copolymer and has a thickness of 1.0 mm is prepared, a birefringence of the injection molding sheet is 1 nm or higher and 200 nm or lower.

10. The cyclic olefin-based copolymer described in any one of 1. to 9.,
in which the aromatic vinyl compound contains at least one kind of compound selected from allylbenzene, 1-vinylnaphthalene, 2-vinylnaphthalene, and 9-vinylanthracene.

11. The cyclic olefin-based copolymer described in any one of 1. to 10.,
in which q in Formula (D-1) represents 0.

12. A resin composition containing the cyclic olefin-based copolymer described in any one of 1. to 11.

13. A molded product containing the cyclic olefin-based copolymer described in any one of 1. to 11.

14. The molded product described in 13., which is an optical lens.

The invention claimed is:
1. An optical lens constituted with a molded product containing a cyclic olefin-based copolymer having a constitutional unit (A) derived from an α-olefin having 2 to 20 carbon atoms, a constitutional unit (B) derived from a cyclic olefin, and a constitutional unit (C) derived from an aromatic vinyl compound represented by general formula (C-1),

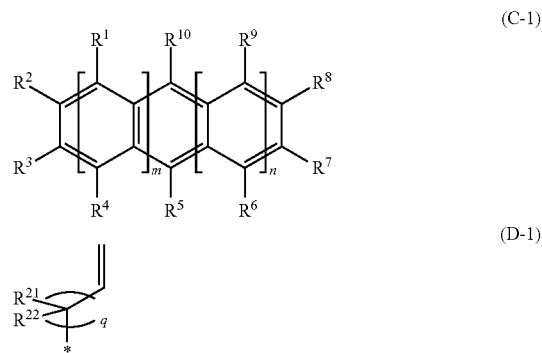

wherein in formula (C-1), any one of all Rs represented by $R^1$ to $R^{10}$ is a hydrocarbon group having a vinyl group represented by formula (D-1), * in formula (D-1) represents a bond,
in formulas (C-1) and (D-1), all of m and n represent 0, q represents a positive integer,
$R^1$ to $R^{10}$ other than the hydrocarbon group having a vinyl group represented by formula (D-1), $R^{21}$, and $R^{22}$ each independently represent a hydrogen atom, a halogen atom except for a fluorine atom, or a hydrocarbon group having 1 to 20 carbon atoms that may be substituted with a halogen atom except for a fluorine atom, $R^2$ and $R^3$, and $R^7$ and $R^8$ may form a monocyclic ring by being bonded to each other, and the monocyclic ring may have a double bond,
wherein in a case where a total content of the constitutional unit (A), the constitutional unit (B), and the constitutional unit (C) in the cyclic olefin-based copolymer is 100 mol %, a content of the constitutional unit (A) in the cyclic olefin-based copolymer is 50 mol % or more and 70 mol % or less.

2. The optical lens according to claim 1,
wherein an Abbe number (v) is 30 or more and 55 or less.

3. The optical lens according to claim 1,
wherein in a case where a total content of the constitutional unit (B) and the constitutional unit (C) in the cyclic olefin-based copolymer is 100 mol %, a content of the constitutional unit (C) in the cyclic olefin-based copolymer is 1 mol % or more and 95 mol % or less.

4. The optical lens according to claim 1,
wherein the cyclic olefin contains a compound represented by formula (B-1),

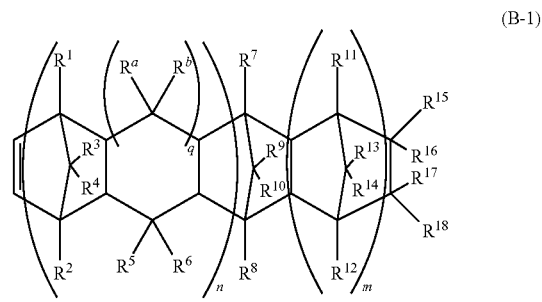

wherein in formula [B-1], n is 0 or 1, m is 0 or a positive integer, q is 0 or 1, to $R^{18}$, $R^a$, and $R^b$ each independently represent a hydrogen atom, a halogen atom, or a hydrocarbon group which may be substituted with a halogen atom, $R^{15}$ to $R^{18}$ may form a monocyclic ring or a polycyclic ring by being bonded to each other, the monocyclic ring or the polycyclic ring may have a double bond, and $R^{15}$ and $R^{16}$ or $R^{17}$ and $R^{18}$ may form an alkylidene group.

5. The optical lens according to claim 4,
wherein m in formula (B-1) represents a positive integer.

6. The optical lens according to claim 1,
wherein in general formulas (C-1) and (D-1), q represents 1 or 2.

7. The optical lens according to claim 1,
wherein a glass transition temperature (Tg) of the cyclic olefin-based copolymer measured using a differential scanning calorimeter (DSC) is 100° C. or higher and 180° C. or lower.

8. The optical lens according to claim 1,
wherein a limiting viscosity [η] of the cyclic olefin-based copolymer measured in decalin at 135° C. is 0.05 dl/g or higher and 5.00 dl/g or lower.

9. The optical lens according to claim 1,
wherein a birefringence is 1 nm or higher and 200 nm or lower.

10. The optical lens according to claim 1,
wherein the aromatic vinyl compound contains allylbenzene.

* * * * *